(12) United States Patent
Brotherton et al.

(10) Patent No.: US 7,677,144 B2
(45) Date of Patent: Mar. 16, 2010

(54) BRAKE DRUM FINISHING AND BALANCING

(75) Inventors: Joseph A. Brotherton, Portland, OR (US); Timothy Todd Griffin, Athens, TN (US)

(73) Assignee: Consolidated MetCo, Inc, Vancouver, WA (US)

( * ) Notice: Subject to any disclaimer, the term of this patent is extended or adjusted under 35 U.S.C. 154(b) by 1200 days.

(21) Appl. No.: 10/779,037

(22) Filed: Feb. 17, 2004

(65) Prior Publication Data

US 2005/0257652 A1 Nov. 24, 2005

(51) Int. Cl.
*B23B 1/00* (2006.01)
*B23B 5/00* (2006.01)
(52) U.S. Cl. .......................... 82/1.11; 82/112
(58) Field of Classification Search ................. 82/1.11, 82/112, 104, 129, 163; 407/48, 40, 53, 103, 407/33, 34, 64
See application file for complete search history.

(56) References Cited

U.S. PATENT DOCUMENTS

| 3,307,251 A | * | 3/1967 | Magyar | ................. 29/406 |
| 4,986,149 A | | 1/1991 | Carmel et al. | |
| 5,483,855 A | | 1/1996 | Julow et al. | |
| 5,842,388 A | * | 12/1998 | Visser et al. | ............ 82/1.11 |
| 6,247,219 B1 | * | 6/2001 | Austin et al. | .............. 29/434 |

* cited by examiner

*Primary Examiner*—Will Fridie, Jr.
(74) *Attorney, Agent, or Firm*—Edward J. Brosius

(57) ABSTRACT

An improved brake drum and method for machining and balancing a brake drum are provided. The inner facing surface and the outer facing surface of the brake drum are machined. The inner and outer faces of the hub end of the brake drum are also machined. The machining is accomplished in a single operation that results in a radially balanced brake drum.

2 Claims, 4 Drawing Sheets

BRAKE DRUM FINISHING AND BALANCING

BACKGROUND OF THE INVENTION

The present invention relates to brake drums and, in particular, to improved finished and balanced brake drums and a method of finishing and balancing such brake drums.

Most brake drums for trucks and similar heavy duty vehicles are comprised of a cast iron brake drum that is subsequently machined to near final tolerances. Typically, the machined brake drum has a slight imbalance that needs to be corrected. Accordingly, the brake drum is subjected to a balancing operation after machining. Such balancing can comprise welding correcting weights to an outer surface of the drum or removing part of the brake drum.

In particular, brake drums that have an integral raised squealer band extending from near an open end of the brake drum can be balanced by removing a portion of the squealer band. Such balancing by removing a portion of the squealer band to a constant or substantially constant depth is shown in U.S. Pat. No. 5,483,855. Another method of balancing is shown in U.S. Pat. No. 4,986,149, which discloses the removing of a crescent or wedge of material from the integral squealer band. It is desirable to provide a machined and balanced brake drum, and a method for machining and balancing such a brake drum.

SUMMARY OF THE INVENTION

It is an object of the present invention to provide an improved machined and balanced brake drum.

It is another object of the present invention to provide an improved method of machining and balancing a brake drum.

It is another object of the present invention to provide an improved method of machining and balancing a brake drum by machining the inner and outer radial surfaces of the brake drum. It is another object of the present invention to provide an improved method of machining and balancing a brake drum by machining the inner and outer surfaces of the hub end of the brake drum.

The improved method for balancing a brake drum in accordance with the present invention utilizes a cutting or milling machine or a lathe to machine the inner and outer radial surfaces of the brake drum. The inner and outer surfaces of the hub end of the brake drum can also be machined. This machining is accomplished in a single operation while the brake drum is held in a chuck assembly. The chuck assembly holds the brake drum at selected points around the outer radial edge of the open end of the brake drum. Such chuck assembly is designed to accurately hold the brake drum during machining to avoid eccentricity in the brake drum as it is rotated in the chuck assembly and exposed in the outer heads. Further, the brake drum is held in the chuck assembly in a manner that allows almost all of the outer radial surface of the brake drum to be machined. The result of the machining is to produce a brake drum that is balanced radially about the central radial axis of the brake drum.

DETAILED DESCRIPTION OF THE PREFERRED EMBODIMENT

Figure 1:
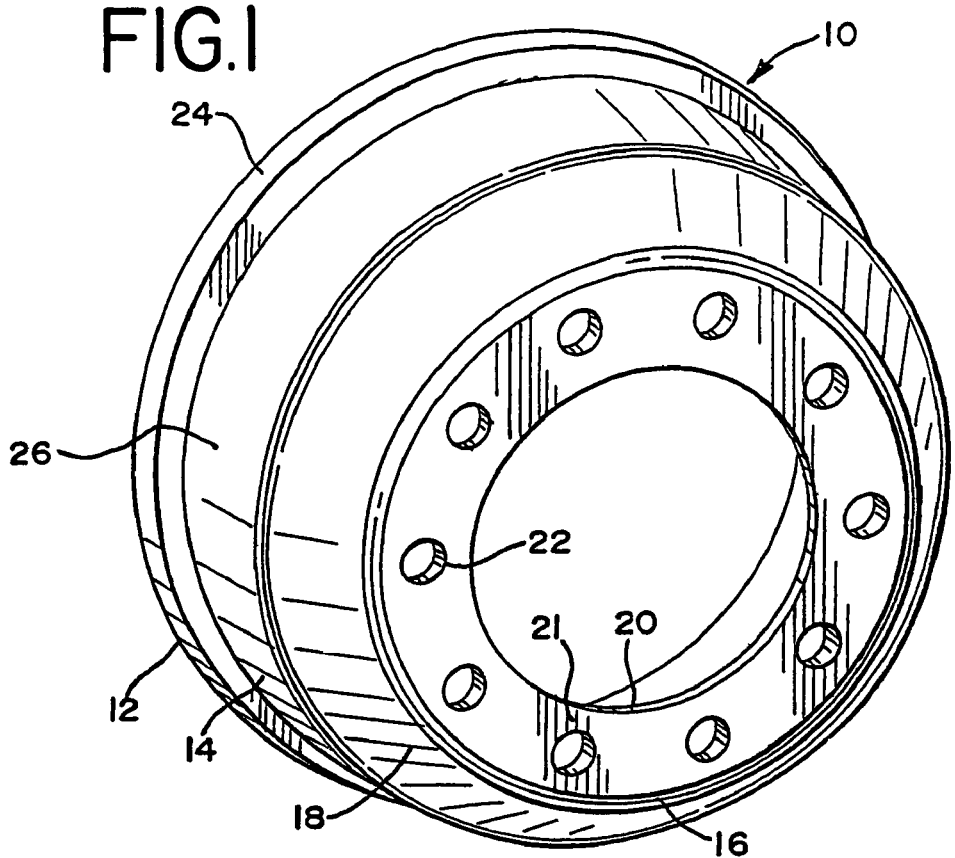
FIG. 1 is a perspective view of a brake drum in accordance with the present invention.
Figure 2:
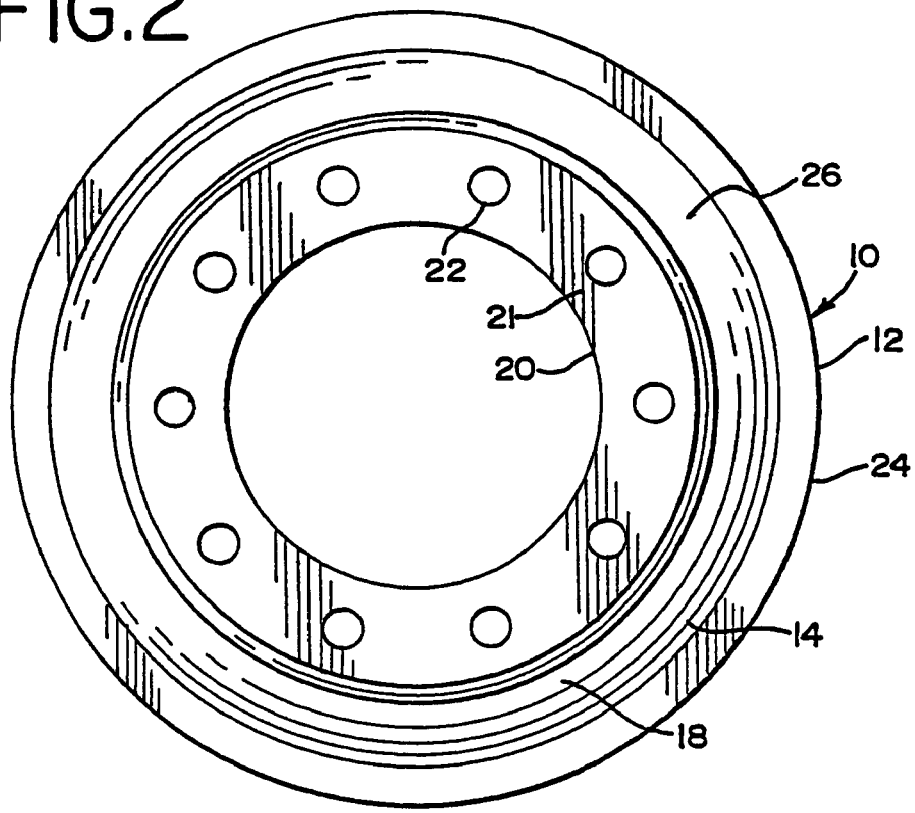
FIG. 2 is an end view of the hub end of a brake drum in accordance with the present invention.
Figure 3:
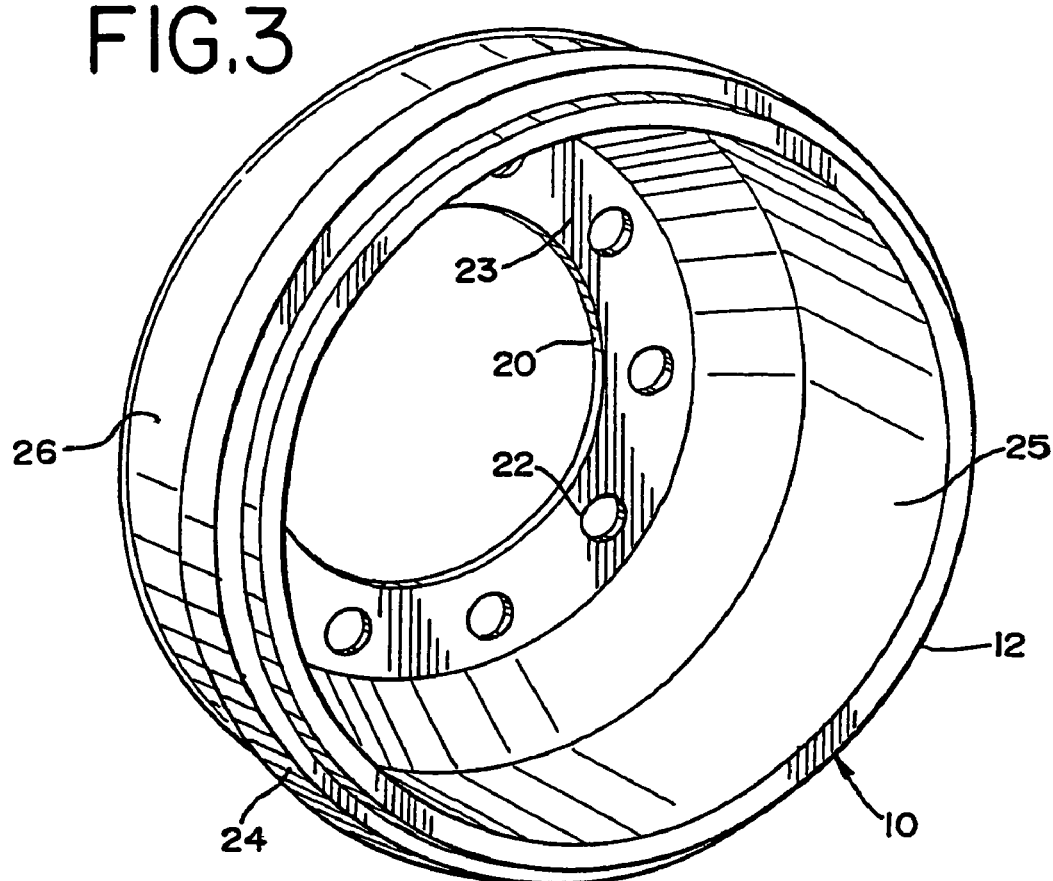
FIG. 3 is a perspective view of the open end of a brake drum in accordance with the present invention.
Figure 4:
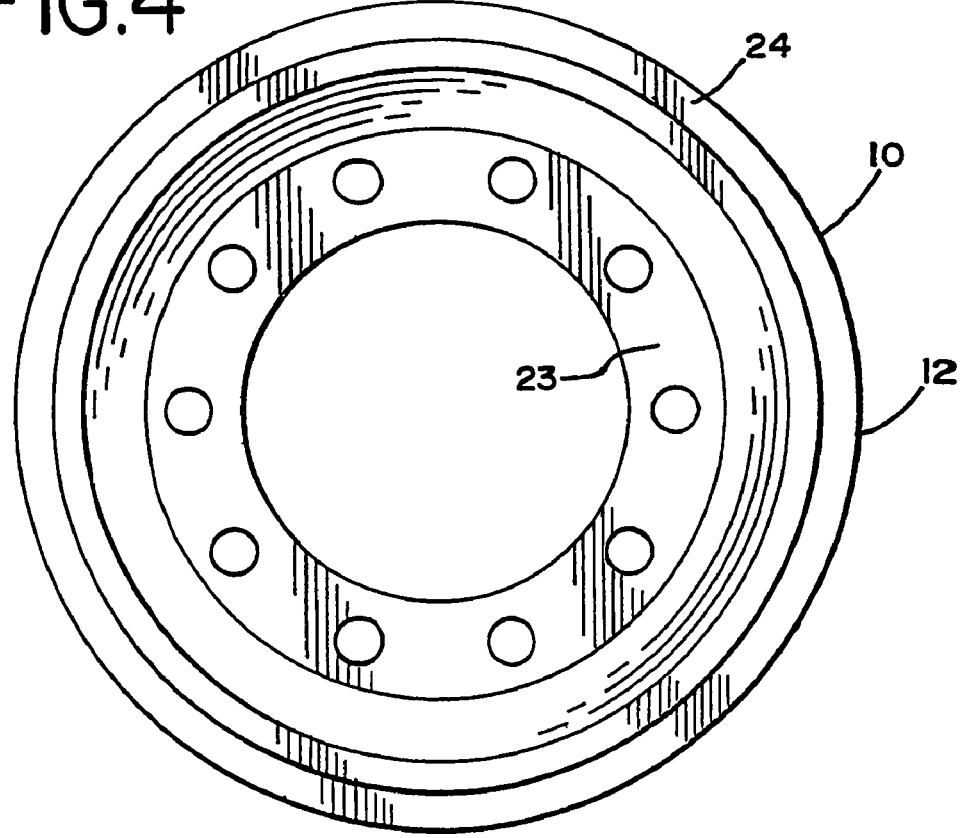
FIG. 4 is an end view of the open end of a brake drum in accordance with the present invention.

Referring to FIGS. 1-4 of the drawings, a brake drum in accordance with an embodiment of the present invention is shown generally at 10. It is seen that brake drum 10 is a generally cylindrical structure, having a circular open end 12 and a generally cylindrical braking section 14 extending from open end 12 to hub end 16. Hub end 16 is seen to comprise a generally flat outer surface 21 and inner surface 23 that terminates by forming circular hub opening 20. A plurality of wheel lug openings 22 are spaced around outer surface 21 of hub end 16.

Transition section 18 is seen to extend from braking section 14 to outer surface 21 of hub end 16. Braking section 14 itself is a generally cylindrical section extending at a nearly normal relation to open end 12. However, it is also understood that a preferred embodiment of the present invention could have the outer surface 26 of braking section 14 extending at a slightly less than normal angle to open end 12.

It should be understood that brake drum 10 is typically made of cast iron in a foundry operation. Accordingly, finishing machining operations are necessary. Such machining would include the finishing of an inner surface 25 of braking section 14 to assure a nearly perfect inner cylindrical surface. Such surfaces are necessary to accommodate the brake pads from the braking structure that brake drum 10 would surround.

Figure 5:
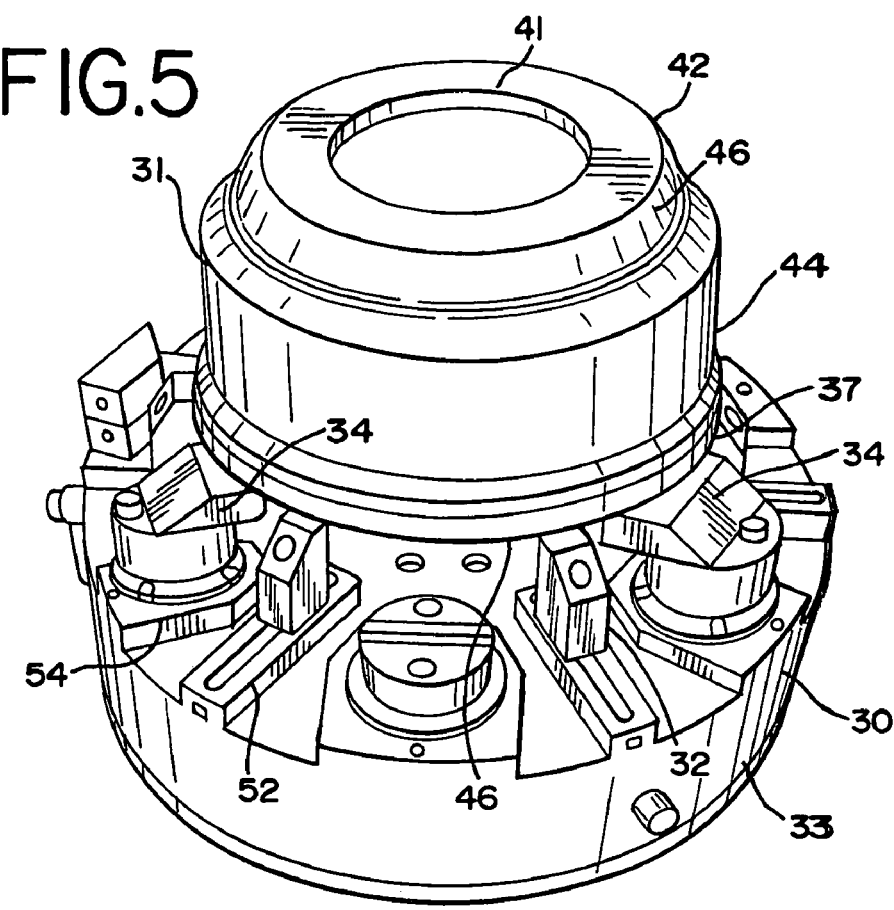
FIG. 5 is a perspective view of a brake drum held in a chuck assembly in accordance with the present invention.
Figure 6:
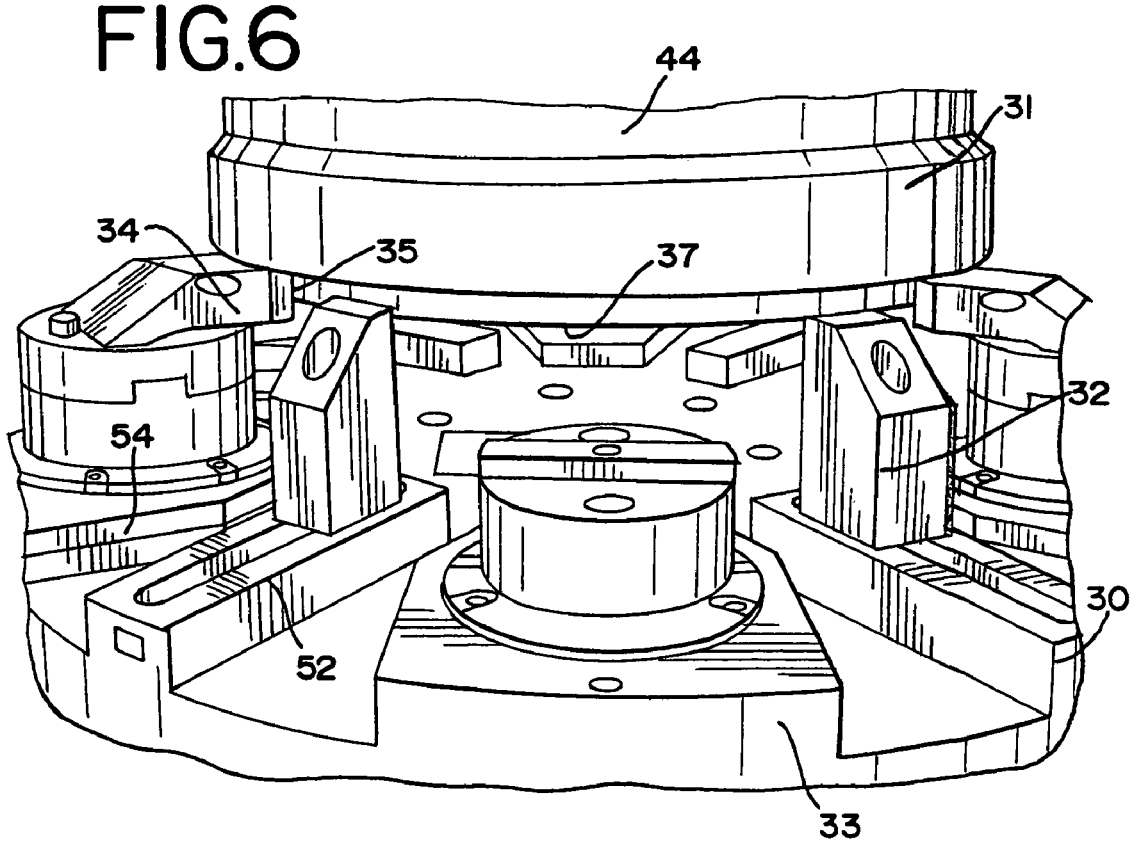
FIG. 6 is a partial detailed side view of a brake drum held in a chuck assembly in accordance with the present invention.

Referring to FIGS. 5 and 6, unfinished brake drum 31 is shown to be a generally cylindrical structure. Brake drum 31 is usually made of iron in a foundry casting operation. Accordingly, outer facing surface 41 of hub end 42, and outer radial surface 44 of brake drum 31 are shown to have an unfinished, as cast surface. Transition area 46 between hub end 42 and outer radial surface 44 is also shown to have an unfinished, as cast surface. Open end 37 of brake drum 31 faces downwardly.

It is understood that an inner facing surface (not shown) of hub end 42 also has an unfinished, as cast surface. Further, an inner radial surface (not shown) of brake drum 31 also has an unfinished, as cast surface.

Chuck assembly 30 is seen to comprise a cylindrical base section 33. A plurality, usually four, of set up posts 32 are radially adjustably positioned in set-up post supports 52 which are themselves affixed to base section 33. Set up posts 32 assist in the radically centered positioning of brake drum 31 on base section 33. This assures that brake drum 31 is radially centered for concentric machining.

A plurality, usually four, of jaw clamps 34 are providing to grasp and hold brake drum 31 on base section 33. Each jaw clamp 34 itself is held in a jaw clamp support 54 which is affixed to base section 33. Such jaw clamp 34 is seen to be able to rotate through an arc in order to contact and hold brake drum 31 on base section 33. Note that the contact between jaw clamp 34 and brake drum 31 is at preselected locations about radial edge 35 of an open end 37 of brake drum 31. It is seen that the preselected contact locations are rather inobtrusive and leave almost all of the outer radial surface 44 of brake drum 31 open to machining by a cutting head.

Figure 7:
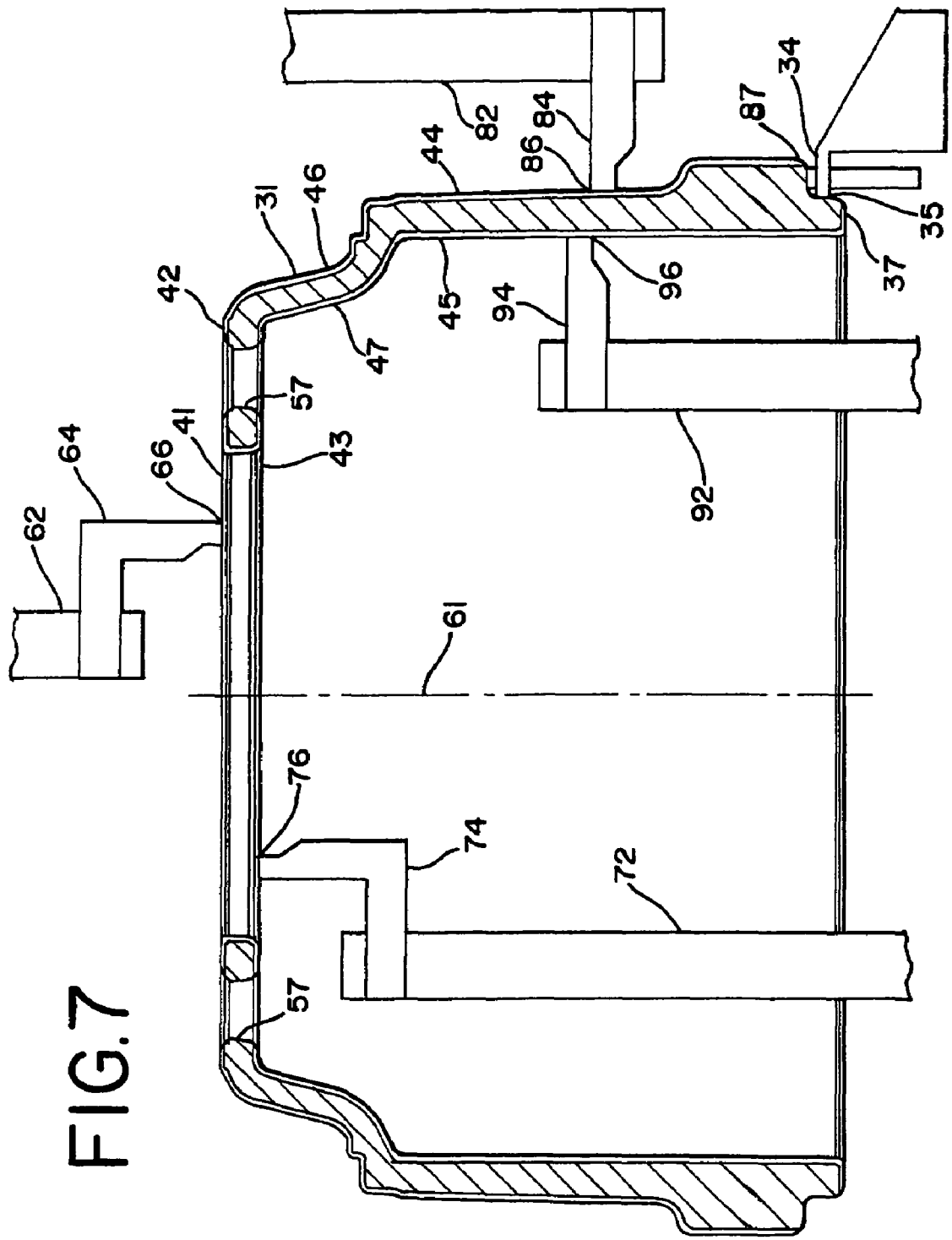
FIG. 7 is a perspective view in partial cross section of a brake drum held in a chuck assembly with cutting heads also shown.

Referring now to FIG. 7, brake drum 31 is seen to also include inner facing surface 43 of hub end 42, inner radial surface 45 and inner transition surface 47 between inner facing surface 43 of hub end 42 and inner radial surface 45. Lug openings 57 are also shown in hub end 42.

Outer hub cutting head holder 62 is seen to support cutting head arm 64 and cutting head edge 66. It can be seen that as brake drum 31 is rotated about its radial center axis 61 while held in chuck assembly 30, outer hub cutting head holder 62 can be programmed to have cutting head edge 66 contact and machine the entire outer facing surface 41 of hub end 42.

Inner hub cutting head holder 72 is seen to support cutting head arm 74 and cutting head edge 76. It can be seen that as brake drum 31 is rotated about its radial center axis 61 while held in chuck assembly 30, inner hub cutting head holder 72 can be programmed to have inner hub cutting head edge 76 contact and machine the entire inner facing surface 43 of hub end 42.

Outer radial cutting head holder 82 is seen to support cutting head arm 84 and cutting head edge 86. It can be seen that as brake drum 31 is rotated about its radial center axis 61 while held in chuck assembly 30, outer radial cutting head edge 86 contact and machine virtually the entire outer radial surface 44 and outer transition section surface 46 of brake drum 31. Only the small area from open end 37 to the bottom 87 of the outer radial surface 44 is not machined in this operation due to the need for jaw clamp 34 to contact brake drum 31 at preselected locations 35.

Inner radial surface cutting head holder 92 is seen to support cutting head arm 94 and cutting head edge 96. It can be seen that as brake drum 31 is rotated about its radial center axis 61 while held in chuck assembly 30, inner radial cutting head holder 92 can be programmed to have inner radial cutting edge 96 contact and machine the entire inner radial surface 45 and inner transition surface 47.

Accordingly, it is seen how brake drum 31 is machined and balanced in a single operation while held in chuck assembly 30.

What is claimed is:

1. A method of machining and balancing a brake drum comprising the steps of:

providing a brake drum having a generally cylindrical body having a central radial axis and an open end and a hub end, the hub end comprising an inner facing surface and an outer facing surface, the brake drum body including an outer radial surface and an inner radial surface, the outer radial surface including a radial edge, holding the radial edge of the open end in a chuck assembly, machining the inner facing surface and outer facing surface of the hub end, and machining the outer radial surface and inner radial surface of the brake drum body in an operation to radially balance the brake drum about the central radial axis, wherein the chuck assembly holds the brake drum at selected locations along the radial edge of the open end to allow substantially all of the outer radial surface of the brake drum to be machined, and exposing the brake drum while held in the chuck assembly to an outside radial cutting head for machining the outer radial surface of the brake drum and an inside radial cutting head for machining the inner radial surface of the brake drum, and exposing the brake drum while held in the chuck assembly to an inside vertical cutting head for machining the inner facing surface of the hub end and an outside vertical cutting head for machining the outer facing surface of the hub end.

2. A method of machining and balancing a brake drum comprising the steps of:

providing brake drum having a generally cylindrical body having a central radial axis and an open end and a hub end, the hub end comprising an inner facing surface and an outer facing surface, the brake drum body including an outer radial surface and an inner radial surface, holding the brake drum in a chuck assembly, machining the outer radial surface and inner radial surface of the brake drum body and machining the inner facing surface and outer facing surface of the hub end, in an operation to balance the brake drum about the central radial axis, wherein the brake drum outer radial surface includes an outer radial edge, and wherein the chuck assembly holds the brake drum at selected locations along the outer radial edge to allow substantially all of the outer radial surface of the brake drum to be machined, exposing the brake drum while held in the chuck assembly to an outside radial cutting head for machining the outer radial surface of the brake drum and to an inside radial cutting head for machining the inner radial surface of the brake drum, exposing the brake drum while held in the chuck assembly to an inside vertical cutting head for machining the inner facing surface of the hub end and an outside vertical cutting head for machining the outer facing surface of the hub end.

\* \* \* \* \*